United States Patent [19]

Rutkowski

[11] Patent Number: 5,384,446

[45] Date of Patent: * Jan. 24, 1995

[54] METHOD OF CONTROLLING THE LENGTH OF METAL CHIPS

[76] Inventor: Edward D. Rutkowski, 18045 St. Louis, Detroit, Mich. 48234

[*] Notice: The portion of the term of this patent subsequent to Apr. 6, 2010 has been disclaimed.

[21] Appl. No.: 8,335

[22] Filed: Jan. 25, 1993

Related U.S. Application Data

[63] Continuation of Ser. No. 650,466, Feb. 4, 1991, Pat. No. 5,200,593.

[51] Int. Cl.⁶ ............................................. B23K 26/00
[52] U.S. Cl. ........................... 219/121.69; 219/121.82
[58] Field of Search ................... 219/121.68, 121.69, 219/121.67, 121.72, 121.82

[56] References Cited

U.S. PATENT DOCUMENTS 4,356,376 10/1982 Komanduri et al. ............ 219/121.72
4,638,143 1/1987 Akeel ............................. 219/121.74

FOREIGN PATENT DOCUMENTS 0160293 11/1985 European Pat. Off. .

Primary Examiner—C. L. Albritton
Attorney, Agent, or Firm—Dykema Gossett

[57] ABSTRACT

A method is disclosed for controlling the length of chips removed from a workpiece that is being machined. A path is etched into the surface of the workpiece by a laser beam and defines a pattern of chip break points. The material is cut away from the workpiece along a second path which periodically intersects with the first path. At the intersection point a chip will break away from the workpiece. By controlling the distance between intersection points, the present invention allows one to control the length of the chips formed during machining.

4 Claims, 1 Drawing Sheet

METHOD OF CONTROLLING THE LENGTH OF METAL CHIPS

This is a continuation of copending application Ser. No. 07/650,466 filed on Feb. 14, 1991, now U.S. Pat. No. 5,300,593.

BACKGROUND OF THE INVENTION

This application relates to a method of machining a part, wherein the length of metal chips removed from the part can be controlled. More particularly, the present invention relates to a method of ensuring that the length of the chips is within a predetermined range.

Machining operations as known in the prior art have problems with chips removed from a workpiece. These chips cause problems if they are overly long, or too short. The chips can clog cutting machinery, which could damage the machinery or cause downtime. Further, long chips can score finished surfaces. Lastly, the chips may be somewhat dangerous to operators.

In response to this problem, attempts have been made to control chip length. One known solution is to periodically apply a high pressure water jet to the chip when it reaches a desired length. This approach has proved unsatisfactory since it does not provide adequate accuracy in chip length.

Another known prior art solution involves the use of a mechanical scribe, which scribes a chip break line into the part. As the part is machined, chips will form from the part until it reaches the chip break line, at which time the chips break off. Mechanical scribes have been unsuccessful for several reasons. First, they are inaccurate in the depth of the chip break line that they cut in the part. Also, the metal on metal contact of the scribe on the part results in undesirable wear. Further, the scribe mechanisms are complicated, too slow, and typically are not adaptable to machine different sized workpieces.

In one disclosed method, a laser beam is moved relative to a workpiece to etch the chip break line into the workpiece. In a disclosed embodiment, the workpiece is rotated while the laser beam is moved radially over the workpiece surface. The laser is preferably mounted on a robot arm which moves about the workpiece. In this way a pattern is formed in the workpiece. By controlling the speed of rotation, the speed of radial movement of the laser and the intensity of the laser, the depth of the break line can be controlled. Further, the size or width of the break line can also be controlled by controlling the various laser variables.

In one disclosed embodiment, a torque convertor housing end plate is machined using the method according to the present invention. It should be understood, however, that the method of the present invention will extend to machining of any known part and particularly including tubular members, or other non-planar parts.

These and other objects and features of the present invention can be best understood from the following specification and drawings, of which the following is a brief description.

DETAILED DESCRIPTION OF A PREFERRED EMBODIMENT

Figure 1:
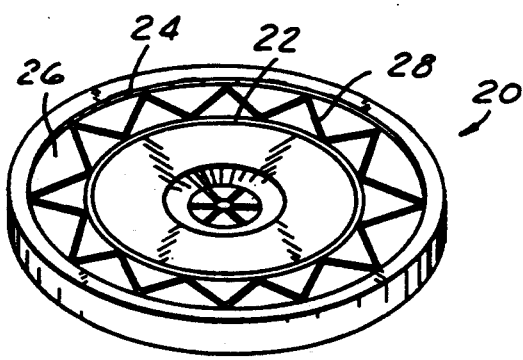
FIG. 1 is a perspective view of a workpiece to be machined by the method of the present invention.

A method of machining a workpiece or part 20 will be disclosed. Part 20 is illustrated in FIG. 1 as a torque convertor end plate housing having an inner ring 22 and an outer periphery 24. Material 26 between ring 22 and outer periphery 24 is to be removed by a rim cutting machining process. Essentially, a cutting element removes material from the plane of material 26 to define a finished surface. In such machining operations, chips of machined material are typically formed. An etched chip break pattern 28 is formed and controls the length of those chips. Although a particular generally planar part 20 is illustrated, it should be understood that the teachings of this invention extend to the removal of any type of material from any type of workpiece including tubular or other non-planar workpieces. The teachings of this invention allow an operator to control chip length in any machining operation, including turning, boring, chamfering or other operations. The disclosed part 20 is formed of a relatively soft metal, and the teachings of this invention are particularly useful in combination with machining of soft metal workpieces, which typically have problems with chip length.

Figure 2:
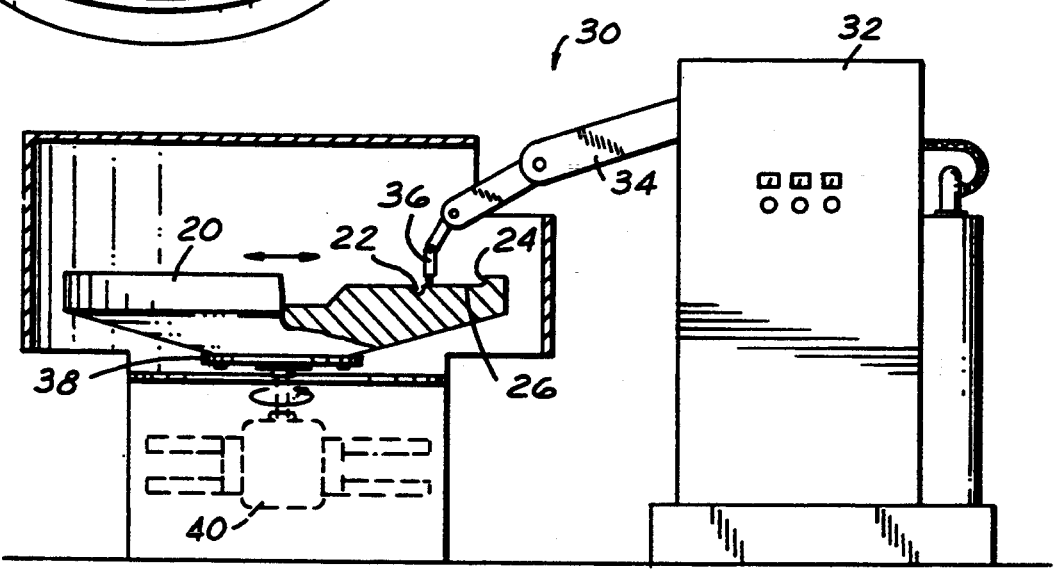
FIG. 2 is a largely schematic view of an apparatus for performing the method of the present invention.

FIG. 2 schematically shows etching system 30 including laser 32 which includes robot arm 34 moving laser tip 36 about part 20. Part 20 is rotated on rotary plate 38. Robot arm 34 moves laser tip 36 radially on part 22, such that etched pattern 28 is formed. By controlling the speed of rotation of rotary plate 38, the speed of movement of laser tip 36, and the intensity of the laser beam from laser tip 26, the pattern and depth of cut of break line pattern 28 is controlled.

Once pattern 28 has been etched into part 20, a machining operation takes place. As a known material removing or cutting element crosses material 26, chips will be formed until the chip reaches a break line formed by a portion of pattern 28. The break line causes the chip to break off. The pattern is selected such that the majority of the chips formed will fall within a desired range of lengths. Some of the chips formed may be relatively short, while others may be relatively long. It may not be necessary to completely control chip lengths, and thus a range may be acceptable. The present invention allows an operator to determine a desired range of chip lengths and have the majority of the chips fall within that range. If it is important to ensure that that range is extremely small, the pattern may be determined, in combination with the movement of the cutting element, to result in chips within the desired range of lengths. The details of determining the desired pattern is within the skill of a worker in the art.

Figure 3:
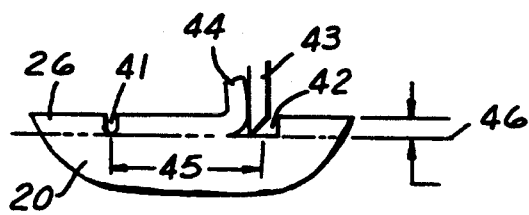
FIG. 3 is a cross-sectional view of a portion of the workpiece being machined.

FIG. 3 shows a portion of part 20. Adjacent chip break lines 41 and 42, which form a portion of pattern 28 are formed in material 26. Cutting element 43 cuts across material 26 and begins to form chip 44. Cutting chip 44 begins at chip break line 42 with cutting element 43 moving to the left as shown in this figure. Chip 44 is formed through distance 45 until cutting element 43 reaches chip break line 41. At that time, chip 44 breaks away. Chip 44 is approximately of a length defined by the distance between lines 41 and 42, which is controlled to result in chips of the desired length. The depth of chip break lines 41 and 42 is approximately equal to a the cuting depth defined by line 46. The depth of the etched chip break line is preferably approximately equal to the cutting depth. If a finished surface is being machined, the depth of the break line should be less than, or equal to, the cutting depth.

Figure 4:
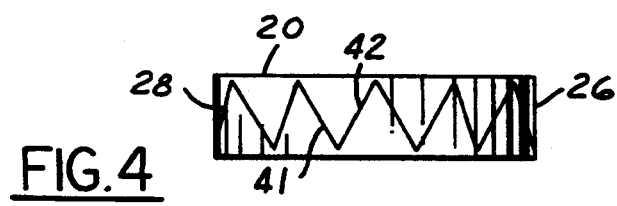
FIG. 4 is a schematic view showing a portion of the workpiece being machined by the present invention.

FIG. 4 is a partial view of workpiece 20 having pattern 28 etched by a laser beam. Pattern 28 includes break line portions 41 and 42 spaced from each other by a predetermined distance. This distance will roughly correspond to the length of chips formed as the material between the break lines is removed. Obviously this distance changes across the thickness of workpiece 20, and this change results in the range of chip lengths.

Figure 5:
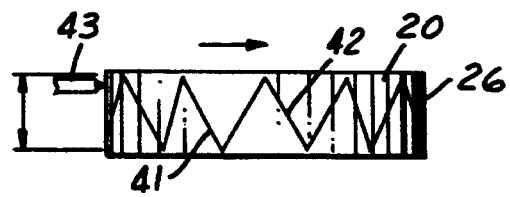
FIG. 5 is a view similar to FIG. 4 schematically showing machining of the workpiece.

FIG. 5 schematically illustrates cutting element 43 removing material 26 from workpiece 20. In the discussed embodiment, workpiece 20 is rotated and cutting element 43 is moved radially along the surface removing material 26. Chips are formed beginning from a particular break line, such as break line 42, until the chip crosses break line 41. At that point, the chip breaks away from workpiece 20. By controlling the distance between adjacent break lines 41 and 42 the size of the chips formed can be controlled.

In a sense, the etching could be said to be creating a first chip break path, and the cutting could be said to be directed along a second path which periodically intersects the first path. The intersection points between the paths define break points for the chips. Thus, by controlling the distance between these intersection points, either by controlling the pattern of the etched first path, or the movement of the cutting element, one can control the length of the chips removed from the material.

In a most preferred embodiment of the present invention, the laser is a $CO_2$ laser. A laser available from Mazik, a Japanese company may be used. Other types and brands of lasers may be selected depending on the material being machined. Although a particular system for etching the workpiece has been disclosed, it should be understood that the teachings of this invention extend beyond the use of a particular laser, or even the use of lasers generally. The broad teachings of this invention extend to any fluent beam, and may include any electromagnetic or ultrasonic beam, and even a high pressure fluid jet.

Although a robot is shown for moving the laser beam, any method of moving the beam relative to the part is considered within the teachings of this invention. As examples, the beam could be moved by moving mirrors, as is well-known in laser technology, or could be guided on rails.

A preferred embodiment of the present invention has been disclosed, however, a worker of ordinary skill in the art would recognize that certain modifications would come within the scope of this invention. For that reason the following claims should be studied in order to determine the true scope and content of the present invention.

I claim:

1. A method of machining a workpiece comprising the steps of:
   (i) directing a laser beam onto a workpiece and continuously moving the laser beam along a workpiece surface to etch a first path into the workpiece surface;
   (ii) cutting material away from the workpiece along a second path, with a second path intersecting the first path to the define break points for chips of removed material; and
   (iii) wherein said the first path defines a continuing pattern on the workpiece, and the second path sequentially intersects several points on the first path, the distance between subsequent intersection points defining the length of a chip that is removed from the workpiece, the pattern being selected such that the maximum chip length is less than a desired maximum.

2. A method of machining a workpiece as recited in claim 1, wherein the laser beam is mounted on a moving member, and the laser beam is moved by moving said moving member.

3. A method of machining a workpiece comprising the steps of:
   (i) directing a fluent beam onto a workpiece, and continuously moving the fluent beam along a workpiece surface to etch a first path into the workpiece surface;
   (ii) cutting material away from the workpiece along a second path, with the second path intersecting the first path to define break points for chips of removed material; and
   (iii) wherein the first path defines a continuing pattern on the workpiece, and the second path sequentially intersects several points on the first path, the distance between subsequent intersection points defining the length of a chip that is removed from the workpiece, the pattern being selected such that the maximum chip length is less than the desired maximum.

4. A method is recited in claim 3, wherein said fluent beam is a laser beam.

* * * * *